"" US010675592B2

(12) United States Patent
Daramola et al.

(10) Patent No.: US 10,675,592 B2
(45) Date of Patent: Jun. 9, 2020

(54) ACID MINE DRAINAGE TREATMENT MEANS

(71) Applicant: University of the Witwatersrand, Johannesburg, Johannesburg, Gauteng (ZA)

(72) Inventors: Michael Olawale Daramola, Gauteng (ZA); Bongile Silinda, Mpumalanga (ZA); Sandile Aubrey Masondo, Gauteng (ZA)

(73) Assignee: University of the Witwatersrand, Johannesburg, Johannesburg (ZA)

( * ) Notice: Subject to any disclaimer, the term of this patent is extended or adjusted under 35 U.S.C. 154(b) by 132 days.

(21) Appl. No.: 15/735,628

(22) PCT Filed: May 30, 2016

(86) PCT No.: PCT/IB2016/053177
§ 371 (c)(1),
(2) Date: Dec. 12, 2017

(87) PCT Pub. No.: WO2017/208052
PCT Pub. Date: Dec. 7, 2017

(65) Prior Publication Data

US 2018/0296987 A1    Oct. 18, 2018

(51) Int. Cl.
*B01D 61/02*  (2006.01)
*B01D 69/02*  (2006.01)
*B01D 69/06*  (2006.01)
*B01D 69/14*  (2006.01)
*B01D 71/02*  (2006.01)
(Continued)

(52) U.S. Cl.
CPC ....... *B01D 69/148* (2013.01); *B01D 67/0079* (2013.01); *B01D 69/02* (2013.01); *B01D 69/06* (2013.01); *B01D 71/02* (2013.01); *B01D 71/68* (2013.01); *C02F 1/44* (2013.01); *C02F 1/442* (2013.01); *B01D 61/027* (2013.01);
(Continued)

(58) Field of Classification Search
None
See application file for complete search history.

(56) References Cited

U.S. PATENT DOCUMENTS

2011/0027599 A1    2/2011    Hoek et al.
2013/0137784 A1    5/2013    Krause et al.
(Continued)

FOREIGN PATENT DOCUMENTS

CN         104492287 A  *  4/2015

OTHER PUBLICATIONS

Li, Hong et al—CN104492287A Machine Translation—2015 (Year: 2015).*
(Continued)

*Primary Examiner* — Bradley R Spies
(74) *Attorney, Agent, or Firm* — Fish & Richardson P.C.

(57) ABSTRACT

An acid mine drainage (AMD) treatment means comprising polyethersulfone (PES) having dispersed therein hydroxysodalite (H-SOD) so as to form a membrane is described. The PES-H-SOD membrane is suitable for treatment of acid mine drainage (AMD) by providing a filtration means to remove toxic chemicals, including but not limited to heavy metals. The invention extends to a method of manufacturing the acid mine drainage (AMD) treatment means.

15 Claims, 7 Drawing Sheets

(51) Int. Cl.
B01D 71/68 (2006.01)
C02F 1/44 (2006.01)
C02F 101/20 (2006.01)
C02F 103/10 (2006.01)
B01D 67/00 (2006.01)

(52) U.S. Cl.
CPC ...... B01D 2325/36 (2013.01); C02F 2101/20 (2013.01); C02F 2103/10 (2013.01)

(56) References Cited

U.S. PATENT DOCUMENTS

| | | | | |
|---|---|---|---|---|
| 2014/0251914 A1* | 9/2014 | Ball | .......................... | C02F 9/00 210/667 |
| 2015/0151984 A1* | 6/2015 | Han | ...................... | B01D 69/02 210/490 |
| 2015/0321151 A1* | 11/2015 | Lee | ...................... | B01D 71/56 210/500.38 |

OTHER PUBLICATIONS

Khajavi, Sheida et al—"Synthesis of thin defect-free hydroxy sodalite membranes: New candidate for activated water permeation"—Journal of Membrane Science—2007 (Year: 2007).*

Khajavi, Sheida et al—"Production of ultra pure water by desalination of seawater using a hydroxy sodalite membrane"—Journal of Membrane Science—2009 (Year: 2009).*

Daramola, et al., "Polyethersulphonesodalite (PES-SOD) mixed-matrix membranes: prospects for acid mine drainage (AMO) treatment," The Journal of the Southern African Institute of Mining and Metallurgy, Dec. 015, vol. 115, pp. 1221-1228; 1222, col. 2, para 1; 1222, col. 2, para 4 to 1223, col. 1, para 2-3; 1223, col. 2, para 2; 1224, col. 2, para 1; 1226, col. 2, para 1; Figs 1-2, 4, 8.

International Search Report and Written Opinion of ISA/US for PCT/IB2016/053177 (dated Sep. 22, 2016).

* cited by examiner

ACID MINE DRAINAGE TREATMENT MEANS

FIELD OF THE INVENTION

This invention relates to an acid mine drainage (AMD) treatment means. Particularly, this invention relates to an acid mine drainage (AMD) treatment means comprising polyethersulfone (PES) having dispersed therein hydroxy-sodalite (H-SOD) so as to form a membrane. The membrane is suitable for treatment of acid mine drainage (AMD) by providing a filtration means to remove toxic chemicals, including but not limited to heavy metals and/or metal ions. The invention extends to a method of manufacturing the acid mine drainage (AMD) treatment means.

BACKGROUND OF THE INVENTION

Acid mine drainage (AMD) is a water pollutant that is produced by water flowing through sulphur-bearing materials. Typically, AMD is produced by the oxidation of sulphide minerals, particularly the oxidation of iron sulphides. The formation of AMD may take place by way of natural means through the breakdown of sulphides by bacteria, or by anthropogenic activity, typically mining (Akcil and Koldas, 2006).

Mining industries produce a vast amount of AMD wherein the oxidation of sulphides produces sulphuric acid, which in turn leaches out a range of metals and/or metal ions from ore and/or other metal bearing materials. An increase in the concentration of sulphuric acid lowers the pH of mining water effluent/discharge, which in turn facilitates the leaching out of metals and/or metal ions, including toxic and/or harmful metals and/or metal ions to produce AMD. Often, and particularly in rural and/or third world regions which may lack water treatment facilities, mining water effluent/discharge may contaminate ground water and/or drinking water of the communities living within the vicinity of the mining activity. This compromises the safety of water use for domestic, industrial and/or agricultural activities leading to a scarcity of safe drinking water and environmental damage (Akcil and Koldas, 2006).

Preventing the formation of AMD has proven to be difficult, and instead treatment of AMD to provide clean treated water has been posed as a viable solution. Various AMD treatments are known including, for example, the addition of lime ($Ca(OH)_2$) or limestone ($CaCO_3$) to the AMD in order to increase the pH of the AMD resulting in the precipitation of sulphate as gypsum and the precipitation of heavy metals as metal hydroxides (Santomartino, 2007; Caraballo, 2011; and Herrera 2007). The precipitates are then readily separated and removed to provide a clean water effluent. This has proven problematic since it produces large quantities of metal contaminated gypsum resulting in high operating costs for the safe disposal thereof.

Biological treatments of AMD have also been explored wherein certain sulphate reducing bacteria are added to the AMD. Biological treatments utilize the further addition of organic carbon containing materials to reduce sulphate to sulphide and results in the formation of metal sulphide precipitates. Apart from requiring further expensive disposal means for the safe disposal of the precipitates, the further inclusion of organic carbon containing materials generates hydrogen sulphide therein elevating the reaction temperature which in turn decreases the effectiveness of the AMD treatment (Akcil and Koldas, 2006).

Cation exchange methods have been proposed (Riveros, 2004) for the removal of toxic metals from AMD, however, these have proven to be expensive and ineffective in coping with large volumes of AMD discharge. Carbon nanotubes have also been proposed for the removal of metal ions from aqueous solutions (Salam, 2012).

Membranes have been proposed for the treatment of water (Jacangelo, 1997; Escobar, 2000 and Jacangelo, 1997), and AMD treatment means in the form of membranes have been considered for use in the treatment of AMD discharge to produce clean water. A membrane is generally understood to be a barrier that selectively allows a desired molecule to permeate there through whilst selectively retaining an undesired molecule.

Polymer membranes have been found to display poor chemical and thermal resistance and are readily denatured at low and/or acidic pH and/or at high temperatures. Being denatured at high temperatures makes polymer membranes unsuitable for use in hot desert climates. It has also been found that polymer membranes display low separation performance. Organic polymer membranes are deemed unsuitable for the treatment of acidic pH AMD since the polymer membranes denature and cannot handle high throughput volumes owing to low separation performance. Furthermore, continued use of polymer membranes leads to membrane fouling further lowering the separation performance. In addition, polymer membranes do not possess uniform molecular sized pores and are not chemically stable.

Inorganic membranes have been found to display poor reproducibility limiting their application. Typically, these inorganic membranes include a ceramic support means (or a perforated stainless steel support means) supporting thereon a zeolite. The support provides mechanical strength for the zeolite crystals. Differences in the thermal expansion of the stainless steel support and the zeolite layer on the support at high temperatures promotes defect formation resulting in a significant loss of selectivity. In the case of a ceramic support, there is no temperature mismatch at high temperatures making ceramic a suitable support for the production of supported zeolite membranes. However, inorganic membranes including ceramics are expensive to manufacture when compared to polymer membranes due to the cost of the ceramic support, and are known to be very fragile and brittle causing them to be unsuitable for use in mining industries where equipment should preferably be strong and/or robust and/or elastic to allow for effective use under harsh operating conditions.

There is a need to provide an acid mine drainage treatment means which at least ameliorates one of the disadvantages known in the prior art and/or described herein above.

SUMMARY OF THE INVENTION

In accordance with a first aspect of this invention there is provided an acid mine drainage treatment means comprising polyethersulfone (PES) having dispersed therein hydroxy-sodalite (H-SOD) so as to form a membrane, such that in use, the membrane facilitates the permeation of water there through whilst concomitantly preventing the permeation of metals and/or metal ions there through.

The polyethersulfone (PES) may define a multitude of pores which are matingly engaged by a plurality of hydroxy-sodalite (H-SOD) particles. The hydroxy-sodalite (H-SOD) particles may be embedded within a matrix of polyethersulfone (PES).

The hydroxy-sodalite (H-SOD) particles may be shaped and/or dimensioned to be cubic structures, nano-rod structures and/or a substantially spherical aggregate. The cubic structures, nano-rod structures and/or a substantially spherical aggregate may each be crystalline.

The mating engagement of the hydroxy-sodalite (H-SOD) and the pores defined by the polyethersulfone (PES) may be facilitated by at least one of, but not limited to, the following group of interactions: ionic, ion-dipole, covalent, hydrogen bonding, dipole-dipole, van der Waals, dipole-induced-dipole, London dispersion, π-π interactions, cation-n interactions and anion-π interactions. A chemical bond is formed between two atoms or groups of atoms from hydroxy-sodalite (H-SOD) and polyethersulfone (PES) such that the forces acting between them are such as to lead to the formation of an aggregate with sufficient stability to define the resulting membrane as an independent molecular species.

The polyethersulfone (PES) may further be functionalized to include hydrophilic chemical functional groups, such that in use, the hydrophilic chemical functional groups may attract water molecules to the membrane in turn facilitating permeation of water there through.

The hydroxy-sodalite (H-SOD) may further be functionalized to include hydrophilic chemical functional groups, such that in use, the hydrophilic chemical functional groups may attract water molecules to the membrane in turn facilitating permeation of water there through.

The membrane may be a film, alternatively a sheet.

The film or sheet may include a uniform dispersion of polyethersulfone (PES) pores which have a corresponding uniform dispersion of matingly engaged hydroxy-sodalite (H-SOD) particles.

The membrane may be secured to an acid mine drainage (AMD) discharge conduit, preferably the membrane may be fittingly secured about an inside wall of an acid main drainage (AMD) discharge conduit.

The membrane may be adapted to engage a filtration device, wherein the filtration device receives in use acid main drainage (AMD) discharge.

There is provided a membrane comprising polyethersulfone (PES) and hydroxy-sodalite (H-SOD).

In accordance with a second aspect of this invention there is provided a method for the manufacture of an acid mine drainage (AMD) treatment means, the method comprising the steps of:
  (a). formulating hydroxy-sodalite (H-SOD) particles;
  (b). adding the hydroxy-sodalite (H-SOD) particles to a solvent to form a first mixture;
  (c). adding polyethersulfone (PES) to the first mixture to form a second mixture, which second mixture being homogenous; and
  (d). casting the second mixture onto a solid surface to form a membrane according to the first aspect of this invention.

Step (a) may include at least one of the following sub-steps:
  (i). mixing sodium metasilicate, sodium hydroxide pellets, anhydrous sodium aluminate and de-ionized water to form a first solution;
  (ii). agitating the first solution to form a gel having a molar composition ratio: $5SiO_2:Al_2O_3:50Na_2O:1005H_2O$; and
  (iii). drying the gel to form solid hydroxy-sodalite (H-SOD) particles.

Step (a) Sub-step (iii) may preferably take place via hydrothermal synthesis.

Step (a) may further include a further sub-step, Sub-step (iv): washing the solid hydroxy-sodalite (H-SOD) particles with de-ionized water.

The hydroxy-sodalite (H-SOD) particles formed in Step (a) may be shaped and/or dimensioned to be cubic structures, nano-rod structures and/or a substantially spherical aggregate. The cubic structures, nano-rod structures and/or a substantially spherical aggregate may each be crystalline.

The second mixture may comprise a ratio of [hydroxy-sodalite (H-SOD) particles and polyethersulfone (PES)]:solvent as 1:9.

The method may include a further step, Step (e) allowing the cast membrane to solidify. Step (e) may include phase inversion utilizing distilled water.

The method may include further step, Step (f) removing the solidified membrane from the solid surface.

The solid surface may be glass.

There is further provided for an acid mine drainage treatment means and a method of manufacturing an acid mine drainage treatment means, substantially as herein described, illustrated and/or exemplified herein, with reference to any one of the accompanying diagrammatic figures and/or examples.

BRIEF DESCRIPTION OF THE DRAWINGS

Embodiments of the invention will be described below by way of example only and with reference to the accompanying drawings in which.

DESCRIPTION OF PREFERRED EMBODIMENTS OF THE INVENTION

Acid mine drainage (AMD) is a water pollutant that is primarily caused by water flowing through sulphur-bearing materials (such as for example Fe$_2$S pyrite) to form acidic solutions (Akcil and Koldas, 2006; Kalin, 2006; and Moses and Nordstrom, 1987). By way of example, pyrite is oxidized by oxygenated water to form sulphuric acid (H$_2$SO$_4$) and ferrous sulphate (FeSO$_4$) as shown in Equation 1 below:

$$2FeS_2 + 7O_2 + 2H_2O \rightarrow 4SO_4^{2-} + 4H^+ + Fe^{2+} \quad (1)$$

Further oxidation of ferrous iron (Fe$^{2+}$) to ferric iron (Fe$^{3+}$) occurs when water is exposed to the atmosphere as seen in Equation 2 below:

$$2Fe^{2+} + 0.5O_2 + 2H^+ \rightarrow H_2O + Fe^{3+} \quad (2)$$

The ferric iron (Fe$^{3+}$) can either be precipitated to a red-orange Fe(OH)$_3$ or it can react with pyrite to form more ferrous iron as seen in Equations 3 and 4 below:

$$2Fe^{3+} + 6H_2O \leftrightarrow 6H^+ + 2Fe(OH)_3 \quad (3)$$

$$14Fe^{3+} + FeS_{2(s)} + 28H_2O \rightarrow 2SO_4^{2-} + 16H^+ + 15Fe^{2+} \quad (4)$$

The dissolved ions of SO$_4^{2-}$ and H$^+$ increase the acidity of the water and can further dissolve or leach out metals and/or metal ions, including heaving metals or their ions such as, but not limited to, copper (Cu), lead (Pb), mercury (Hg), iron (Fe), zinc (Zn), and cadmium (Cd). AMD is therefore acidic and contaminated with heavy metals making it unsuitable for domestic, industrial and/or agricultural use and further poisoning ground water and a surrounding environment.

Other metals commonly found in AMD include, but are not limited to, nickel (Ni), sodium (Na), potassium (K), manganese (Mn), aluminium (Al), antimony (Sb), and arsenic (As).

Generally, water having a pH less than or equal to 5.5 is deemed to pose a severe health risk to animals, humans and the environment.

Membranes have been proposed for the treatment of water (Jacangelo, 1997), and AMD treatment means in the form of membranes have been proposed for use in the treatment of AMD discharge to produce clean water. A membrane is generally understood to be a barrier that selectively allows a desired molecule to permeate there through whilst selectively retaining an undesired molecule. Membranes may be solid, liquid, gel, and/or amorphous, and may be homogeneous, heterogeneous, isotropic and/or anisotropic in structure (Ulbricht, 2006).

Polymer membranes have been found to display poor chemical and thermal resistance and are readily denatured at low and/or acidic pH and/or at high temperatures. It has also been found that polymer membranes display low separation performance. Organic polymer membranes are deemed unsuitable for the treatment of acidic pH AMD since the polymer membranes denature and cannot handle high throughput volumes owing to low separation performance. Furthermore, continued use of polymer membranes leads to membrane fouling further lowering the separation performance. In addition, polymer membranes do not possess uniform molecular sized pores and are not chemically stable.

Inorganic membranes have been found to display poor reproducibility limiting their application. Typically, these inorganic membranes include a ceramic support means supporting thereon a zeolite have been proposed. These inorganic membranes are expensive to manufacture when compared to polymer membranes, and are known to be very fragile and brittle causing them to be unsuitable for use in mining industries where equipment should preferably be strong and/or robust to allow for effective use under harsh operating conditions.

In accordance with a first aspect of this invention there is provided an acid mine drainage treatment means comprising polyethersulfone (PES) having dispersed therein hydroxy-sodalite (H-SOD) so as to form a membrane, such that in use, the membrane facilitates the permeation of water there through whilst concomitantly preventing the permeation of metals and/or metal ions there through.

The Applicant has found that the membrane according to the invention (i.e. PES-H-SOD membrane) has smaller pores when compared to polyethersulfone (PES), has an increased Young's modulus when compared to polyethersulfone (PES), has an increased tensile strength when compared to polyethersulfone (PES) and displays in use an increased flux when compared to polyethersulfone (PES). The fact that the PES-H-SOD membrane has pores with a smaller diameter when compared to PES membrane is very surprising and unexpected. Without being limited to theory, the Applicant believes that the unique molecular interactions between the H-SOD and the PES provide for a PES-H-SOD membrane having smaller diameter pores when compared to PES membranes. The smaller diameter pores of the PES-H-SOD membrane according to the invention facilitates, for example, excluding metals and/or metal ions having a certain kinetic diameter. Predicting physico-chemical properties of the formed PES-H-SOD membrane is not readily possible, and the quest to be able to predict the nature of intermolecular forces in the design of property-specific supramolecular entities (such as the PES-H-SOD membrane according to the invention) remains one of the greatest scientific challenges of our age (Ball, 1996 and Maddox, 1988).

Polyethersulfone (PES) is known as a glassy polymer which is porous displaying pores ranging in diameter between about 400 Angstrom to about 50,000 Angstrom (between about 40 to about 5000 nanometers). The chemical structure of polyethersulphone (PES) is shown below in Scheme 1:

Polyethersulfone (PES)

The pore sizes of polyethersulphone (PES) readily allow for the passage of water molecules (which have a kinetic diameter of about 2.65 Å). Furthermore, many heavy metal ions will readily pass through PES pores, including for example, but not limited to, Pb (II) (kinetic diameter 2.66 Å), Cd (III) (kinetic diameter 1.94 Å), Cu(II) (kinetic diameter 1.44 Å), Mg (II) (kinetic diameter 7.0 Å), Mn(II) (kinetic diameter 1.6-1.8 Å) and Zn(II) (kinetic diameter 1.48 Å).

Polyethersulphone (PES) is consequently not suitable for in the manufacture of a membrane to treat acid mine drainage (AMD) wherein water should be selectively permeable through the membrane and whilst concomitantly preventing the permeation of metals and/or metal ions there through.

Hydroxy-sodalite (H-SOD) is a zeolite (Breck, 1974) which is an aluminosilicate material displaying strong Brønsted acidity. Consequently, H-SOD is a strong proton ($H^+$) donor. This general characteristic of zeolites has led to their widespread use in catalysis. Hydroxy-sodalite (H-SOD) is a crystalline zeolite comprising an array of building blocks, wherein the building blocks are β-cages as illustrated in FIG. 1.

Figure 1:
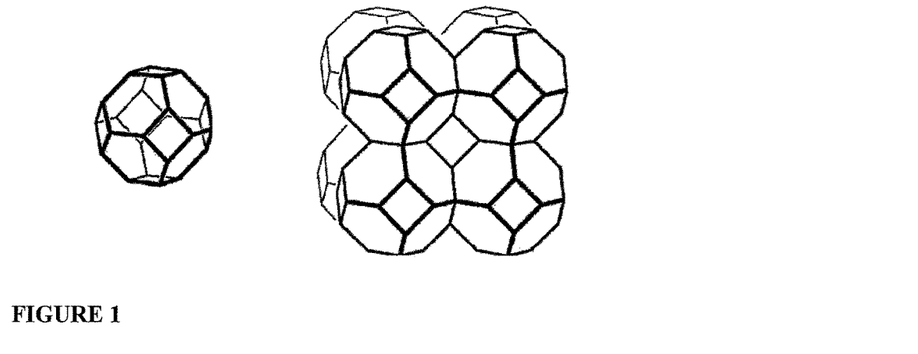
FIG. 1 illustrates the crystal structure of hydroxy-sodalite (H-SOD) showing the building block (β-cage) on the left hand side and the hydroxy-sodalite (H-SOD) structure on the right hand side. Hydroxy-sodalite (H-SOD) defines a cubic structure by vertex linking of $AlO_4$ and $SiO_4$ into four and six-membered oxygen rings.

FIG. 1 illustrates the crystal structure of hydroxy-sodalite (H-SOD) showing the building block (β-cage) on the left hand side and the hydroxy-sodalite (H-SOD) structure on the right hand side. Hydroxy-sodalite (H-SOD) defines a cubic structure by vertex linking of $AlO_4$ and $SiO_4$ into four and six-membered oxygen rings (Breck, 1974).

Hydroxy-sodalite (H-SOD) is porous and defines pores having a diameter of about 2.6 Angstrom (Breck, 1974). Hydroxy-sodalite (H-SOD) is known to occlude water molecules inside its porous framework. It is known that preparatory methods for the manufacture of hydroxy-sodalite (H-SOD) may result not only in cubic crystalline structures but also in nano-rod morphologies and/or masses of aggregated hydroxy-sodalite (H-SOD) particles.

The acid mine drainage treatment means according to the invention comprises polyethersulfone (PES) having dispersed therein hydroxy-sodalite (H-SOD) so as to form a membrane (i.e. a PES-H-SOD membrane). The hydroxy-sodalite (H-SOD), typically crystalline particles, matingly engages the pores defined by the polyethersulfone (PES). The mating engagement of the hydroxy-sodalite (H-SOD) and the pores defined by the polyethersulfone (PES) is facilitated by at least one of, but not limited to, the following group of interactions: ionic, ion-dipole, covalent, hydrogen bonding, dipole-dipole, van der Waals, dipole-induced-dipole, London dispersion, π-π interactions, cation-π interactions and anion-π interactions. A chemical bond is formed between two atoms or groups of atoms from hydroxy-sodalite (H-SOD) and polyethersulfone (PES) such that the forces acting between them are such as to lead to the formation of an aggregate with sufficient stability to define the resulting PES-H-SOD membrane as an independent molecular species.

The polyethersulfone (PES) defines a multitude of pores which are matingly engaged by a plurality of hydroxy-sodalite (H-SOD) particles. The hydroxy-sodalite (H-SOD) particles may also be embedded within a matrix of polyethersulfone (PES).

The hydroxy-sodalite (H-SOD) particles may be shaped and/or dimensioned to be cubic structures, nano-rod structures and/or a substantially spherical aggregate. The cubic structures, nano-rod structures and/or a substantially spherical aggregate may each be crystalline.

The polyethersulfone (PES) may further be functionalized to include hydrophilic chemical functional groups, such that in use, the hydrophilic chemical functional groups may attract water molecules to the membrane in turn facilitating permeation of water there through.

The hydroxy-sodalite (H-SOD) may further be functionalized to include hydrophilic chemical functional groups, such that in use, the hydrophilic chemical functional groups may attract water molecules to the membrane in turn facilitating permeation of water there through.

The membrane may be a film, alternatively a sheet. The film or sheet may include a uniform dispersion of polyethersulfone (PES) pores which have a corresponding uniform dispersion of matingly engaged hydroxy-sodalite (H-SOD) particles.

The membrane may be secured to an acid mine drainage (AMD) discharge conduit, preferably the membrane may be fittingly secured to about an inside wall of an acid main drainage (AMD) discharge conduit.

The membrane may be adapted to engage a filtration device, wherein the filtration device receives in use acid main drainage (AMD) discharge.

In accordance with a second aspect of this invention there is provided a method for the manufacture of an acid mine drainage treatment means, the method comprising the steps of:
(a). formulating hydroxy-sodalite (H-SOD) particles;
(b). adding the hydroxy-sodalite (H-SOD) particles to a solvent to form a first mixture;
(c). adding the polyethersulfone (PES) to the first mixture to form a second mixture, which second mixture being homogenous; and
(d). casting the second mixture onto a solid surface to form a membrane according to the first aspect of this invention.

Step (a) typically includes the following sub-steps:
(i). mixing sodium metasilicate, sodium hydroxide pellets, anhydrous sodium aluminate and de-ionized water to form a first solution;
(ii). agitating the first solution to form a gel having a molar composition ratio: $5SiO_2:Al_2O_3:50Na_2O:1005H_2O$;
(iii). drying the gel to form solid hydroxy-sodalite (H-SOD) particles.

Step (a) Sub-step (iii) preferably takes place via a hydrothermal synthesis method.

Step (a) further includes a further sub-step, Sub-step (iv): washing the solid hydroxy-sodalite (H-SOD) particles with de-ionized water.

The hydroxy-sodalite (H-SOD) particles formed in Step (a) may be shaped and/or dimensioned to be cubic structures, nano-rod structures and/or a substantially spherical aggregate. The cubic structures, nano-rod structures and/or a substantially spherical aggregate may each be crystalline.

The second mixture typically comprises a ratio of [hydroxy-sodalite (H-SOD) particles and polyethersulfone (PES)]:solvent as 1:9.

The method typically includes a further step, Step (e): allowing the cast membrane to solidify. Step (e) may include phase inversion utilizing distilled water.

The method typically includes a further step, Step (f): removing the solidified membrane from the solid surface. The solid surface is usually glass.

There is further provided for an acid mine drainage treatment means and a method of manufacturing an acid mine drainage treatment means, substantially as herein described, illustrated and/or exemplified herein, with reference to any one of the accompanying diagrammatic figures and/or examples.

EXAMPLES

Experimental Method

Solvent (N,N-dimethylacetamide, 97%), polyethersulphone (PES), sodium silicate, sodium aluminate, and sodium hydroxide were purchased from Sigma-Aldrich South Africa. Deionized water was prepared in-house. Acid mine drainage (AMD) samples were directly sourced from a small stream at the mine dumps in Dobsonville in Gauteng Province, South Africa. All chemicals were used as supplied without any further purification.

Manufacture of Hydroxy-Sodalite (H-SOD) Particles and the Manufacture of the Acid Mine Drainage (AMD) Treatment Means Comprising Polyethersulfone (PES) Having Dispersed Therein Hydroxy-Sodalite (H-SOD) so as to Form a Membrane (i.e. a PES-H-SOD Membrane)

Hydroxy sodalite (H-SOD) particles, particularly H-SOD crystals, were prepared via hydrothermal synthesis using sodium metasilicate, sodium hydroxide pellets, anhydrous sodium aluminate and de-ionized water as materials. These materials were mixed together in a polytetrafluoroethylene (PTFE) bottle and stirred for 1 hour on a magnet stirrer at 1000 rpm to yield a gel of molar composition ratio: $5SiO_2$: $Al_2O_3$: $50Na_2O$:$1005H_2O$. During the hydrothermal synthesis, ~45 mL (or ~48 g) of the vigorously mixed precursor solution was poured into a Teflon-lined stainless steel autoclave and subjected to hydrothermal synthesis at 140° C. K for 3.5 hours. At the end of the hydrothermal synthesis, the as-prepared H-SOD particles (in crystalline form) were washed thoroughly with de-ionized water until the pH of the washed water was neutral. The washed crystals collected on filter paper were dried overnight at 373 K in an oven.

Figure 2:
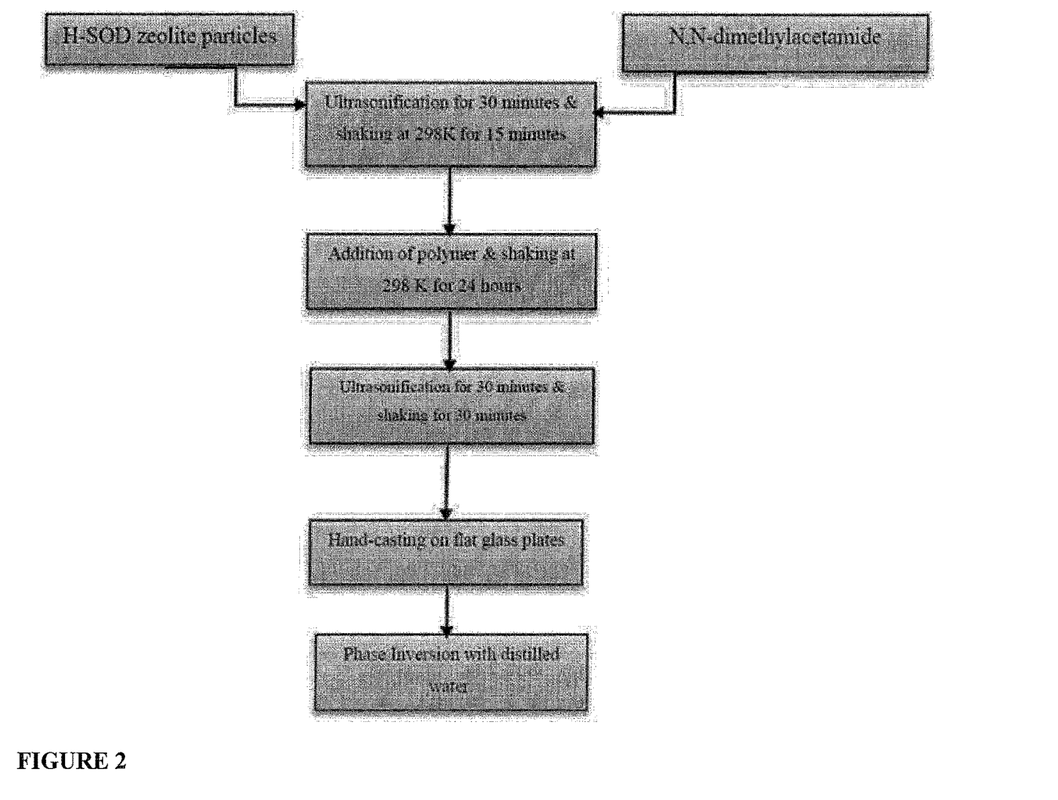
FIG. 2 shows an experimental procedure for a method for the manufacture of an acid mine drainage treatment means in accordance with a second aspect of the invention.

A homogeneous mixture for the fabrication of each membrane was prepared by measuring specific amounts of H-SOD crystals, polymer, and solvent with the ratio of SOD/PES to solvent in the mixture maintained at 1:9 throughout the syntheses. The amount of the PES was kept at 0.40 g throughout while the quantities of H-SOD particles and solvent were varied. Consequently, the weight percentages of the H-SOD crystals in the synthesized PES-SOD membranes were 5 wt. %, 10 wt. %, and 15 wt. %. Membranes were fabricated by hand-casting the homogeneous mixture on a glass plate using 'DR BLADE'. Reproducibility of synthesis was ensured by fabricating two batches under the same conditions, but at different times and locations. In addition, pure PES membrane (with 0 wt. % H-SOD) was synthesized for comparison. FIG. 2 depicts the steps involved in the synthesis of the membranes.

The wt. % is in relation to the product (membrane). 0 wt. % indicates that the PES membrane has no H-SOD particles embedded within it.

Characterization of the Hydroxy-Sodalite (H-SOD) Particles and the Membrane (PES-H-SOD Membrane)

The morphology and crystallinity of the synthesized H-SOD crystals were analyzed with scanning electron microscopy (SEM) using energy-dispersive X-ray spectroscopy (EDS) (Phillips XL 20), and X-ray diffractometry (XRD) (Bruker D8 advance X-ray diffractometer) using CoKα radiation (λ=0.179 nm) at a scan rate of 0.25 seconds per step and a step size of 0.02°, respectively. Further confirmation of the purity of the H-SOD crystals was obtained using Fourier transform infrared (FTIR) spectroscopy, conducted with a Bruker IFS spectrometer using KBr pellets as background. Furthermore, the morphology of the fabricated mixed matrix membranes was examined using SEM.

Figure 3:
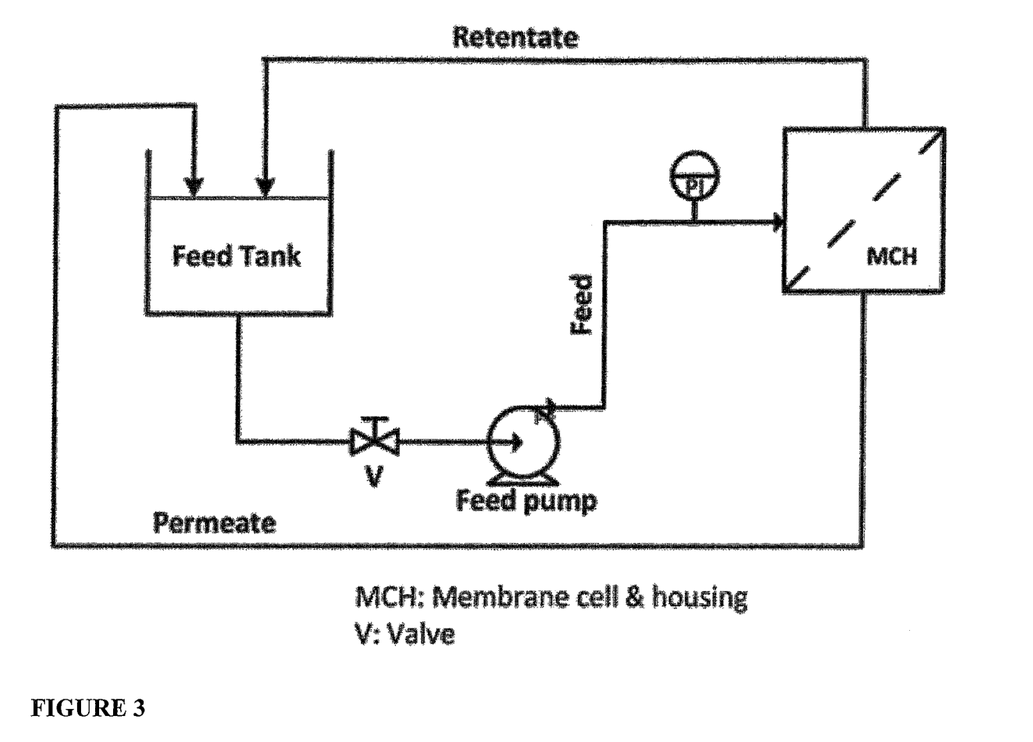
FIG. 3 shows a membrane filtration set-up for testing the an acid mine drainage treatment means according to a first aspect of the invention.

Performance and Evaluation of the Membrane During Acid Mine Drainage (AMD) Treatment The performance of the PES-H-SOD membranes during treatment of AMD discharge was evaluated using a cross-filtration set-up as shown in FIG. 3. Filtration tests were conducted at a feed temperature of 298 K and a pressure of 1.1 bar, using the membrane having an effective permeation area of 45 cm². Atomic absorption spectrophotometry (AAS) was used to determine the concentration of various metal ions in the AMD before treatment (feed stream) and after treatment (permeate and retentate streams). The concentration of the metal ions in raw AMD as per the AAS analysis is summarized in Table 1 below. The pH of the raw AMD obtained from the pH meter (model: HI 2550 pH/ORP and EC/TDS/NaCl meter) was 2.28. The membrane flux and the rejection (expressed in percentage) of the metal ions were obtained using Equation 5 and Equation 6, respectively:

$$Jp = \frac{Qp}{A} \quad (5)$$

where Qp is the permeate mass flow rate (g/min), Jp is the permeate flux (g·cm⁻²·min⁻¹), and A is the effective membrane area (cm²).

$$Ri = \frac{Cfi - Cpi}{Cfi} \times 100 \quad (6)$$

where Ri is the percentage rejection of component i (%), and Cf and Cp are the concentrations of component i in the feed and permeate streams (mg/L), respectively.

TABLE 1

| Cationic composition of the AMD used | |
|---|---|
| Cation | Concentration (mg · L−1) pH = 2.28 |
| Cu 2+ | 15.98 |
| Zn 2+ | 86.47 |
| Fe 3+ | 833.0 |
| Pb 2+ | 4.300 |
| Mn 2+ | 51.58 |
| Al 3+ | 1370 |
| Mg 2+ | 848.8 |

Results and Discussion

Synthesis and Characterization of the Hydroxy-Sodalite (H-SOD) Particles

Figure 4:
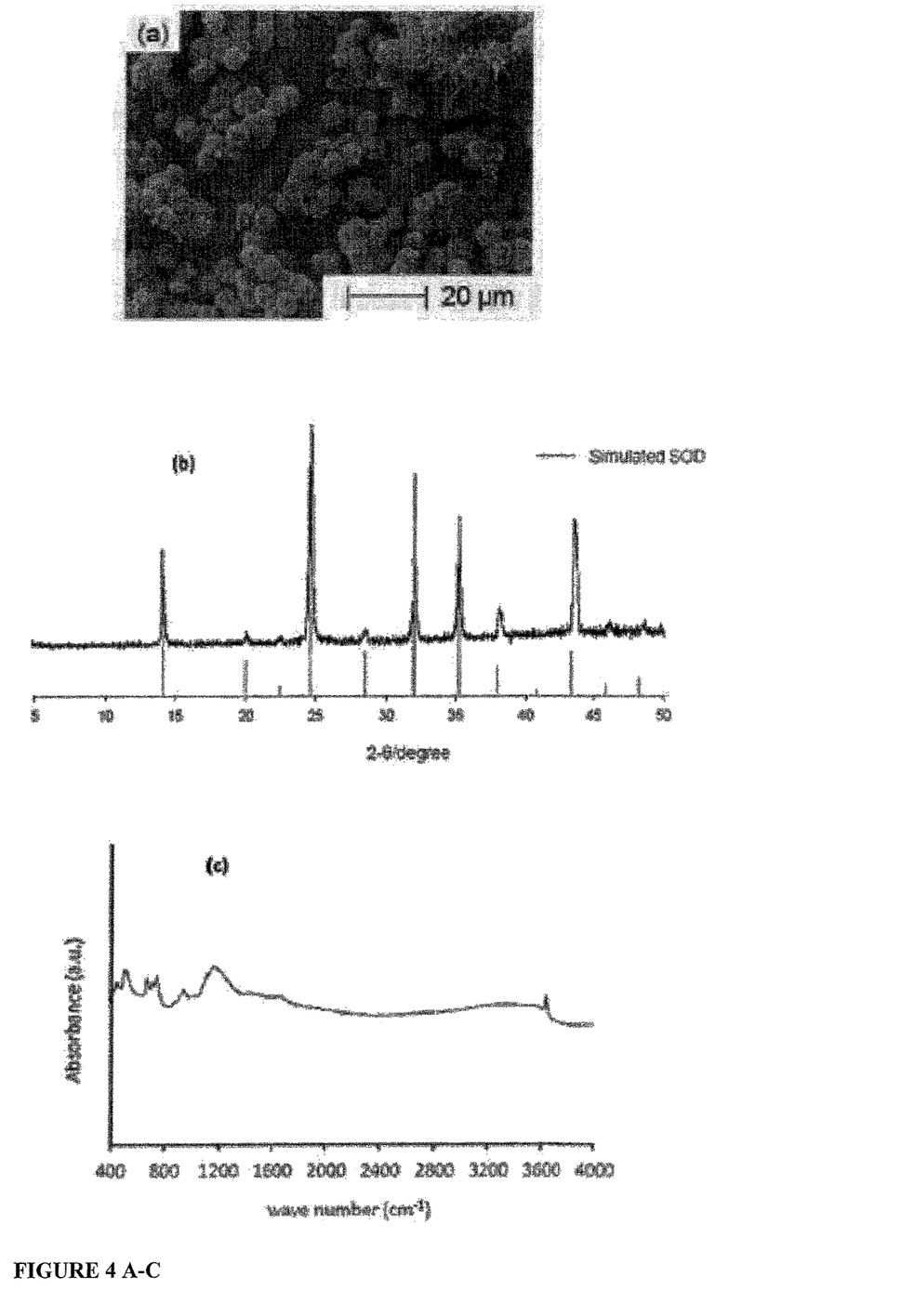
FIG. 4 shows physico-chemical characterization of synthesized hydroxy-sodalite (H-SOD) particles, wherein said hydroxy-sodalite (H-SOD) particles are crystalline utilising (a) scanning electron microscopy (SEM); (b) X-ray diffraction techniques; and (c) Fourier Transform Infra-red spectroscopy (FTIR)

The morphology of the synthesized particles is shown in the SEM image in FIG. 4(a). FIG. 4(b) and FIG. 4(c) confirm the crystallinity and the purity of the synthesized H-SOD crystals. The typical cubic shape of the SOD crystal is visible in FIG. 4(a), confirming the formation of H-SOD crystals during the synthesis. Other morphological shapes such as nano-rod crystals were observed alongside the cubic H-SOD crystals in FIG. 4(a). FIG. 4(b) reveals the formation of pure H-SOD crystals. The EDS analysis of the H-SOD crystals showed a Si/Al ratio of 1-1.5, indicating a H-SOD framework was formed. The FTIR patterns depicted in FIG. 4 (c) confirm the appearance of all characteristic vibrational bands of H-SOD crystals. The strong broad band centered at approximately 1000 cm⁻¹ could be attributed to the asymmetric stretching vibration of T-O-T (T=Si, Al). The symmetric stretching vibration of T-O-T is vividly shown around 740 and 660 cm$^{-1}$. Vibrational stretch of hydroxyl functional groups indicate the presence of water in the H-SOD crystal at 3600 cm$^{-1}$.

Characterization of the Synthesized PES-H-SOD Membrane

Figure 5:
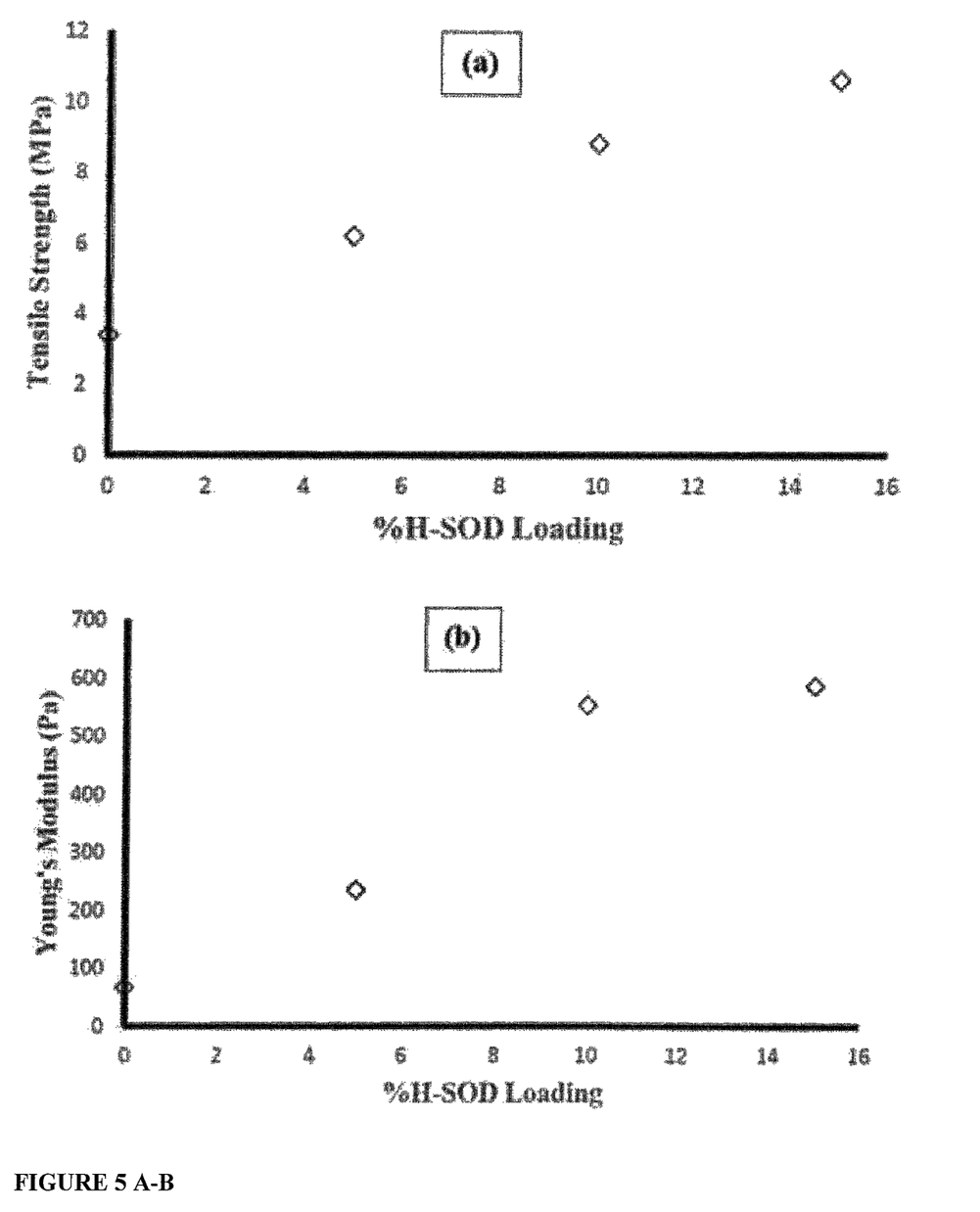
FIG. 5 shows plots relating to mechanical properties of the membrane according to the first aspect of the invention (i.e. PES-H-SOD membrane), wherein (a) shows tensile strength (MPa) as a function of % hydroxy-sodalite (H-SOD) loading (in wt. %) of the polyethersulfone (PES); and (b) shows Young's modulus (Pa) as a function of % hydroxy-sodalite (H-SOD) loading (in wt. %) of the polyethersulfone (PES)

The results of the mechanical property evaluation using a TA.XT Plus texture analyzer at ambient temperature are depicted in FIG. 5. The tensile strength (FIG. 5a) and the Young's modulus (FIG. 5b) of the synthesized PES-H-SOD membranes increased with increasing H-SOD loading. This increased tensile strength and Young's modulus enables the membrane according to the first aspect of the invention to be suitable for mining industry applications.

The 15 wt. % loaded membrane displayed the largest tensile strength of 10.62 MPa, an increase of about 213% compared to that of the PES membrane (0 wt. % H-SOD loaded membrane) (see FIG. 5(a)). This observation further confirms the enhancement of the mechanical strength of PES polymer with the addition of H-SOD. An increase in the Young's modulus for 15 wt. % SOD loaded membrane compared to those for 5 wt. % and 10 wt. % loaded membranes is seen (see FIG. 5 (b)).

Figure 6:
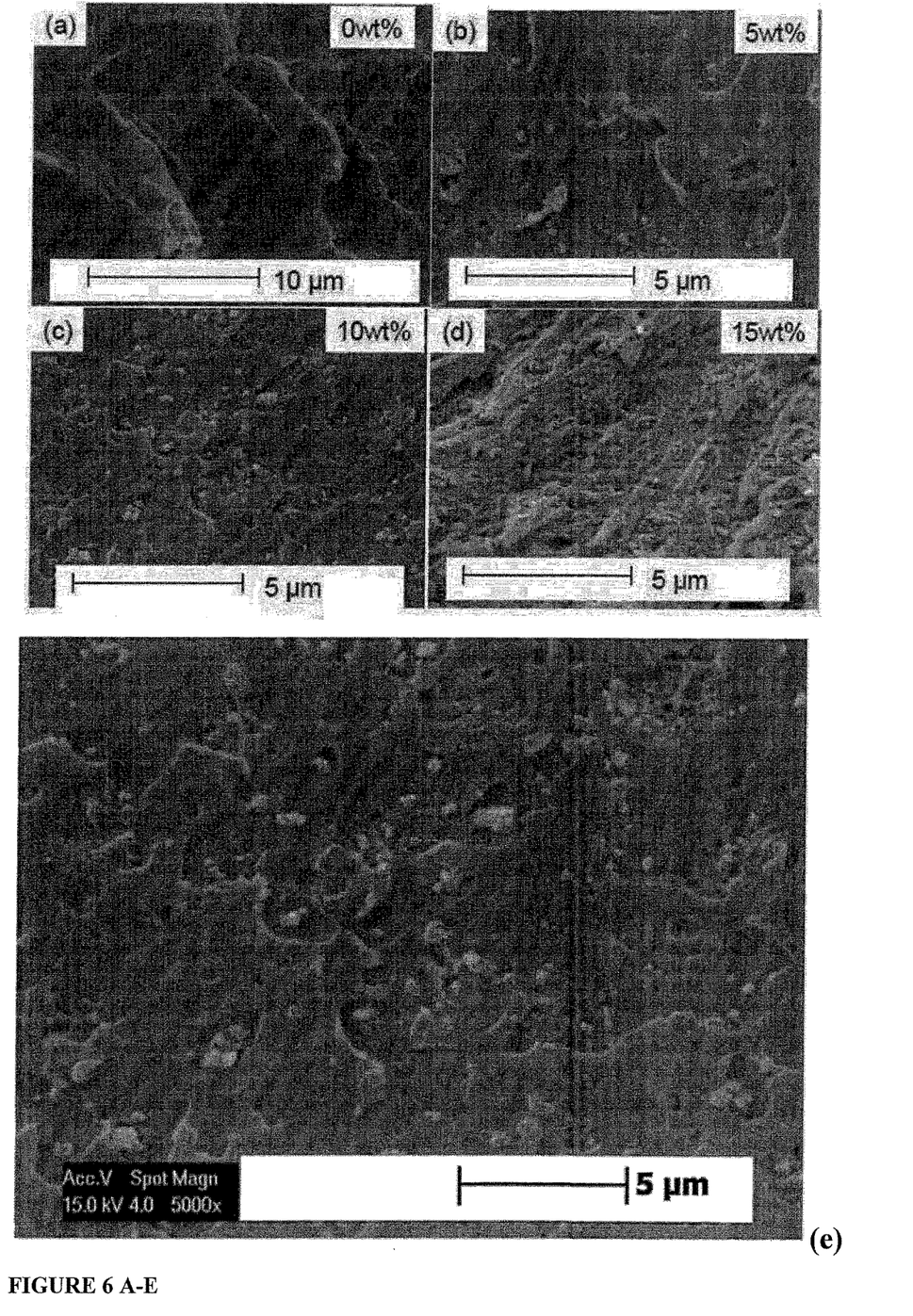
FIG. 6 shows the morphology of the manufactured membranes at different wt. % hydroxy-sodalite (H-SOD) loading, wherein (a) shows a cross-sectional view of polyethersulfone (PES) with 0 wt. % hydroxy-sodalite (H-SOD); (b) shows cross-sectional view of the membrane according to the invention with 5 wt. % hydroxy-sodalite (H-SOD); (c) shows cross-sectional view of the membrane according to the invention with 10 wt. % hydroxy-sodalite (H-SOD); (d) shows cross-sectional view of the membrane according to the invention with 15 wt. % hydroxy-sodalite (H-SOD) and (e) shows a cross-sectional view of the membrane according to the invention with 10 wt. % hydroxyl-sodalite (H-SOD)

FIG. 6 shows the morphology of the manufactured membranes at different % hydroxy-sodalite (H-SOD) loading, wherein (a) shows a cross-sectional view of polyethersulfone (PES) with 0 wt. % hydroxy-sodalite (H-SOD); (b) shows cross-sectional view of the membrane according to the invention with 5 wt. % hydroxy-sodalite (H-SOD); (c) shows cross-sectional view of the membrane according to the invention with 10 wt. % hydroxy-sodalite (H-SOD); (d) shows cross-sectional view of the membrane according to the invention with 15 wt. % hydroxy-sodalite (H-SOD) and (e) shows a cross-sectional view of the membrane according to the invention with 10 wt. % hydroxyl-sodalite (H-SOD).

FIG. 6 shows that H-SOD crystals were well distributed within the pores of the PES polymer and that the ratio of the fractional free volume (FFV) of the PES to the amount of hydroxyl-sodalite (H-SOD) particles within the PES decreased at increasing H-SOD loading. The observed difference between the loaded membranes and the unloaded polymeric membrane of PES only can be seen by comparing FIG. 6(a) with FIGS. 6(b)-(e). The presence of matingly engaged and/or embedded H-SOD particles is clear from FIG. 6(b)-FIG. 6(d), while there are no H-SOD crystals in FIG. 6(a). The presence of matingly engaged and/or embedded H-SOD crystals in the PES confirms successful fabrication of a PES-H-SOD membrane according to the first aspect of this invention.

FIG. 6 (e) shows another cross-sectional view of the PES-H-SOD membrane according to the first aspect of the invention having 10 wt. % loading H-SOD.

Performance Evaluation of the PES-H-SOD Membrane for AMD Treatment

The AMD sample contained high concentrations of iron, aluminium, and magnesium ions, and moderate concentrations of copper ($Cu^{2+}$), zinc ($Zn^{2+}$), lead ($Pb^{2+}$), and manganese ($Mn^{2+}$) ions (see Table 1). The high $Fe^{3+}$ concentration could be attributed to further oxidation of ferrous iron ($Fe^{2+}$) to ferric iron ($Fe^{3+}$). The AMD sample was considered hard since the concentration of magnesium ions (848.78 mg/L) was greater than 120 mg/L.

Figure 7:
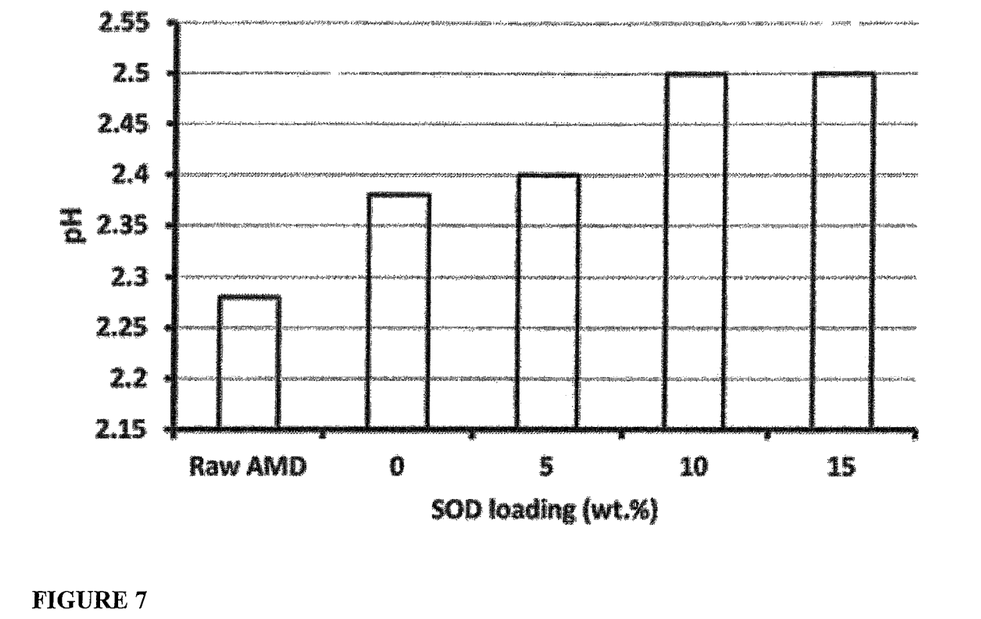
FIG. 7 shows a plot of pH of the treated acid mine drainage (AMD) as a function of the percentage % hydroxysodalite (H-SOD) loading (in wt. %) for the membrane.

The performance of each PES-H-SOD membrane was evaluated at a pump speed of 12 revolutions per second. The concentrations of metal ions and the pH of the permeate sample from each membrane were determined using AAS and a pH meter, respectively. FIG. 7 shows the pH results of the permeate sample for each PES-H-SOD membrane after the treatment. A small increase in the pH from 2.28 for the feed sample to 2.50 (about 9.65% increase) was observed for the permeate samples from the four membranes after the treatment. In addition, an increase in the pH was observed at increasing H-SOD loading, implying that the performance of the PES-H-SOD membranes in accordance with the first aspect of this invention was enhanced with greater H-SOD loading.

Figure 8:
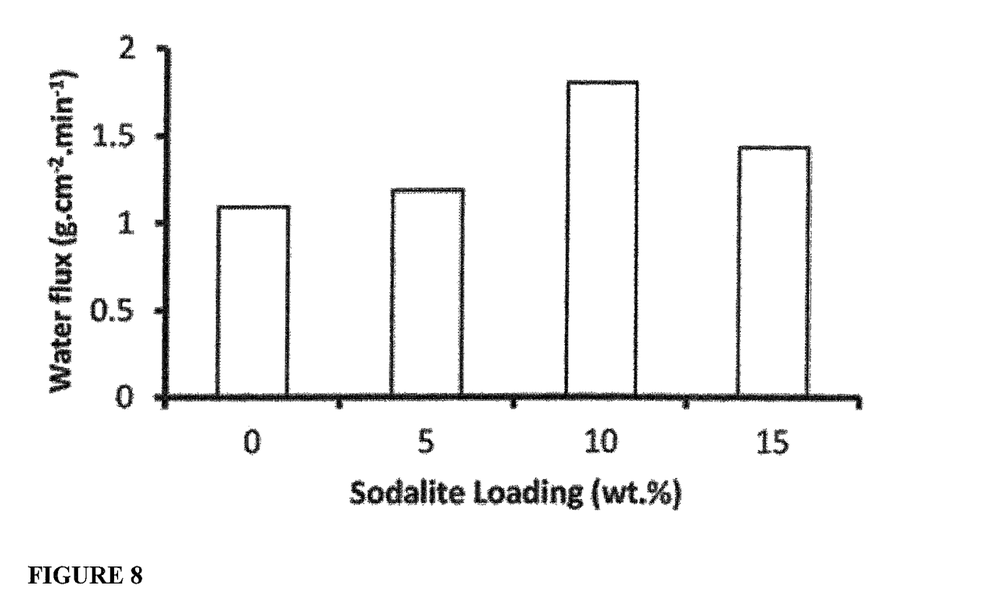
FIG. 8 shows a plot of water flux (g·cm$^{-2}$·min$^{-1}$) as a function of the percentage % hydroxy-sodalite (H-SOD) loading (in wt. %) for the membrane.

FIG. 8 shows that the permeate flux of the membranes increased at increasing H-SOD loading (0 wt. % to 15 wt. % loading), reached a maximum of 1.85 g·cm-2·min-1 at 10 wt. % loading, and then decreased to 1.43 g·cm-2·min-1 at 15 wt. % loading.

One may expect flux to decrease with an increase in H-SOD particle loading since the free fractional volume (FFV) of the PES has decreased. The observed increase in the membrane flux of the PES-H-SOD membranes when compared to that of the PES (0 wt. % loading H-SOD) membrane is surprising and unexpected.

Without being limited to theory, this increase in flux may be attributed to the presence of the H-SOD crystals and the very specific intermolecular forces between the PES pores and the H-SOD particles. The Applicant believes that since H-SOD crystals are hydrophilic in nature, the permeation of water molecules through H-SOD crystals embedded within the PES may have compensated for the reduction in the free fractional volume (FFV) at increasing H-SOD loading, thereby resulting in enhanced water flux at increasing H-SOD loading. The transport of water through the cage of H-SOD crystals may be governed by the sorption capillary flow model, and/or via hydrogen bonding Increased flux with increased H-SOD loading provides for a commercially useful membrane which can cope with high throughput volumes of AMD discharge. This addresses the need in polymer membranes to be able to function effectively at high volumes.

Each H-SOD particle occludes water which may lead one to further expect poor flux through the H-SOD particle pores. However, increased H-SOD loading showed increased flux. The Applicant believes that the water molecules occluded in the cage of the H-SOD may be involved in the transport of water through the cage to the other side of the membrane. Of course more complex molecular interactions may contribute to the functionality of the membrane as a water transporter.

The observed decrease in the membrane flux at higher (15 wt. %) H-SOD loading could be attributed to membrane fouling due to the retention of increased numbers of particles from the AMD. The 15 wt. % loaded membrane did not lose its selectivity, indicating few or no defects in the membrane making the membrane suitable for use in mining industries.

Figure 9:
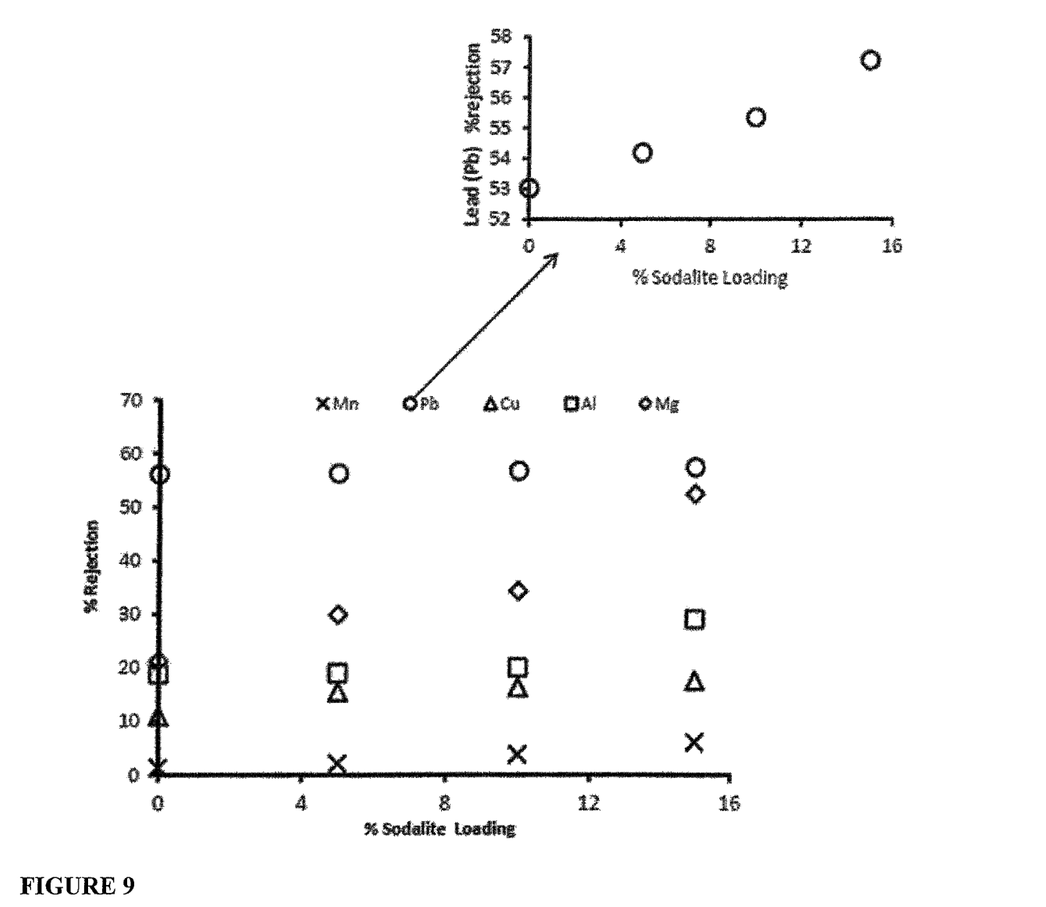
FIG. 9 shows a plot of % metal rejection as a function of the percentage % hydroxy-sodalite (H-SOD) loading (in wt. %) for the membrane at a pump speed of 12 revolutions per second (feed flow rate), pressure: 1 atmosphere, temperature: 25 C, filtration mode: cross-flow.

Furthermore, the performance of the PES-H-SOD membranes was evaluated using selectivity of the membrane to the metal ions. FIG. 9 depicts the percentage rejection of each metal ion by the membranes as a function of the H-SOD loading. Lead ($Pb^{2+}$) was the most rejected of all the metal ions with a maximum rejection of 57.44%. This may, in part, be attributed to the fact that the kinetic diameter of $Pb^{2+}$ is 2.66 Å and the average pore dimension of the H-SOD particles is 2.6 Å.

Rejection of magnesium ($Mg^{2+}$) increased from about 20% to about 50% with increasing H-SOD loading. The kinetic diameter of $Mg^{2+}$ is 0.70 nm, greater than the kinetic diameter of the cage dimension of H-SOD crystals. The increase in rejection could be attributed to the bigger size of the ion and the rejection increased at increasing H-SOD loading.

$Mn^{2+}$ was the least rejected metal ion with a rejection from 1% to 6%.

The maximum percentage $Cu^{2+}$ rejection was 17.6%. $Cu^{2+}$ has a kinetic diameter of about 1.44 Å and any rejection is surprising since the average pore diameter of the H-SOD particles is 2.6 Å. The negatively charged surface of the H-SOD crystals might have contributed to the rejection of $Cu^{2+}$. Consequently, the unique chemico-physical molecular interactions between the PES and the H-SOD in the PES-H-SOD membranes must facilitate metal ion rejection, and rejection is not based on size alone.

Thus the presence of H-SOD crystals within the PES polymer surprisingly improves separation performance of the membranes. Predicting physico-chemical properties of the formed PES-H-SOD membrane is not readily possible since predicting the nature of intermolecular forces in the design of property-specific supramolecular entities (such as the PES-H-SOD membrane according to the invention) remains one of the greatest scientific challenges of our age (Ball, 1996 and Maddox, 1988). The unique chemico-physical properties of the PES-H-SOD membrane according to the invention at least ameliorates one of the disadvantages in the prior art AMD treatment means.

Functionalization of the PES and/or H-SOD of the PES-H-SOD membranes with hydrophilic chemical functional groups may increase hydrophilicity and increase water permeation through the membranes according to the invention.

The Applicant believes that the PES-H-SOD membrane in accordance with the first aspect of the invention at least ameliorates one of the disadvantages known in the prior art and/or described above. The PES-H-SOD membrane allows water to permeate there through whilst concomitantly preventing metals and/or metal ions from permeating there through.

While the invention has been described in detail with respect to specific embodiments and/or examples thereof, it will be appreciated that those skilled in the art, upon attaining an understanding of the foregoing may readily conceive of alterations to, variations of and equivalents to these embodiments. Accordingly, the scope of the present invention should be assessed as that of the appended claims and any equivalents thereto.

REFERENCES

AKCIL, A. and KOLDAS, S. 2006. Acid mine drainage (AMD): causes, treatment and case studies. *Journal of Cleaner Production*, vol. 14. pp. 1139-1145.

BALL, P., Nature, 1996, 381. pp. 648-650.

BRECK, D. W. 1974. Zeolite Molecular Sieves: Structure, Chemistry and Use. Wiley, New York.

CARABALLO, M. A. et al. 2011. Long term remediation of highly polluted acid mine drainage: A sustainable approach to restore the environmental quality of the Odiel river basin. *Environmental Pollution*. 159.

ESCOBAR. I. C, et al. 2000. Removal of assimilable organic carbon and biodegradable dissolved organic carbon by reverse osmosis and nanofiltration membranes. Journal of Membrane Science. 175. Pp. 1-17.

HERRERA, S., UCHIYAMA, H., IGARASHI, T., ASAKURA, K., OCHI, Y., ISHIZUKA, F., and KAWADA, S. 2007. Acid mine drainage treatment through a two-step neutralization ferrite-formation process in northern Japan: Physical and chemical characterization of the sludge. *Minerals Engineering, vol.* 20. pp. 1309.

JACANGELO, J., TRUSSELL, R., and WATSON, M. 1997. Role of membrane technology in drinking water treatment in the United States. *Desalination*, vol. 113. pp. 119-127.

KALIN, M., FYSON, A., and WHEELER, W. N. 2006. The chemistry of conventional and alternative treatment systems for the neutralization of acid mine drainage. *Science of the Total Environment*, vol. 366. pp. 395-408.

MADDOX, J., Nature, 1988.335. Pp. 201.

MOSES, C. O., NORDSTROM, D. K., HERMAN, J. S., and MILLS, A. L. 1987. Aqueous pyrite oxidation by dissolved oxygen and ferric iron, *Geochimica et Cosmochimica Acta*, vol. 1. pp. 1561-1571.

RIVEROS, P. 2004. The extraction of Fe (III) using cation-exchange carboxylic resins. *Hydrometallurgy, vol.* 72, no. 3-4. pp. 279-290.

SALAM, M. A., AL-ZHRANI, G., and KOSA, S. A. 2012. Simultaneous removal of copper(II), lead(II), zinc(II) and cadmium(II) from aqueous solutions by multi-walled carbon nanotubes. *Comptes Rendus Chimie*, vol. 15. pp. 398-408.

SANTOMARTINO, S. and WEBB, J. 2007. Estimating the longevity of limestone drains in treating acid mine drainage containing high concentrations of iron. *Applied Geochemistry, vol.* 22, no. 11. pp. 2344-2361.

ULBRICHT, M. 2006. Advanced functional polymer membranes. *Polymer*, vol. 47. pp. 2217-2262.

The invention claimed is:

1. An acid mine drainage treatment means comprising polyethersulfone (PES) having dispersed therein hydroxy-sodalite (H-SOD) so as to form a membrane, such that in use, the membrane facilitates the permeation of water there through whilst concomitantly preventing the permeation of metals and/or metal ions there through.

2. The acid mine drainage treatment means according to claim 1, wherein the polyethersulfone (PES) defines a multitude of pores which are matingly engaged by a plurality of hydroxy-sodalite (H-SOD) particles.

3. The acid mine drainage treatment means according to claim 2, wherein the hydroxy-sodalite (H-SOD) particles are shaped and/or dimensioned to be cubic structures, nano-rod structures and/or a substantially spherical aggregate.

4. The acid mine drainage treatment means according to claim 3, wherein the cubic structures, nano-rod structures and/or a substantially spherical aggregate are each crystalline.

5. The acid mine drainage treatment means according to claim 1, wherein the polyethersulfone (PES) is functionalized to include hydrophilic chemical functional groups, such that in use, the hydrophilic chemical functional groups attract water molecules to the membrane in turn facilitating permeation of water there through.

6. The acid mine drainage treatment means according to claim 1, wherein the hydroxy-sodalite (H-SOD) is functionalized to include hydrophilic chemical functional groups, such that in use, the hydrophilic chemical functional groups attract water molecules to the membrane in turn facilitating permeation of water there through.

7. The acid mine drainage treatment means according to claim 1, wherein the membrane is a film, alternatively a sheet.

8. The acid mine drainage treatment means according to claim 1, wherein the membrane is adapted to engage a filtration device, and wherein the filtration device receives in use acid main drainage (AMD) discharge.

9. A method for the manufacture of an acid mine drainage treatment means, the method comprising the steps of:
   (a). formulating hydroxy-sodalite (H-SOD) particles;
   (b). adding the hydroxy-sodalite (H-SOD) particles to a solvent to form a first mixture;
   (c). adding the polyethersulfone (PES) to the first mixture to form a second mixture, which second mixture being homogenous; and
   (d). casting the second mixture onto a solid surface to form a membrane.

10. The method according to claim 9, wherein Step (a) further includes the following sub-steps:
   mixing sodium metasilicate, sodium hydroxide pellets, anhydrous sodium aluminate and de-ionized water to form a first solution;
   (ii). agitating the first solution to form a gel having a molar composition ratio: $5SiO_2:Al_2O_3:50Na_2O:1005H_2O$; and
   (iii). drying the gel to form solid hydroxy-sodalite (H-SOD) particles.

11. The method according to claim 10, wherein sub-step (iii) takes place via a hydrothermal synthesis method.

12. The method according to claim 10, wherein Step (a) further includes a further sub-step: (iv) washing the solid hydroxy-sodalite (H-SOD) particles with de-ionized water.

13. The method according to claim 9, wherein the second mixture comprises a ratio of [hydroxy-sodalite (H-SOD) particles and polyethersulfone (PES)]:solvent as 1:9.

14. The method according to claim 9, including a further step, Step (e): allowing the cast membrane to solidify.

15. The method according to claim 14, wherein Step (e) occurs via phase inversion utilizing distilled water.

* * * * *